J. DAIN.
GEARING.
APPLICATION FILED NOV. 2, 1907.
1,028,441.
Patented June 4, 1912.
3 SHEETS—SHEET 2.
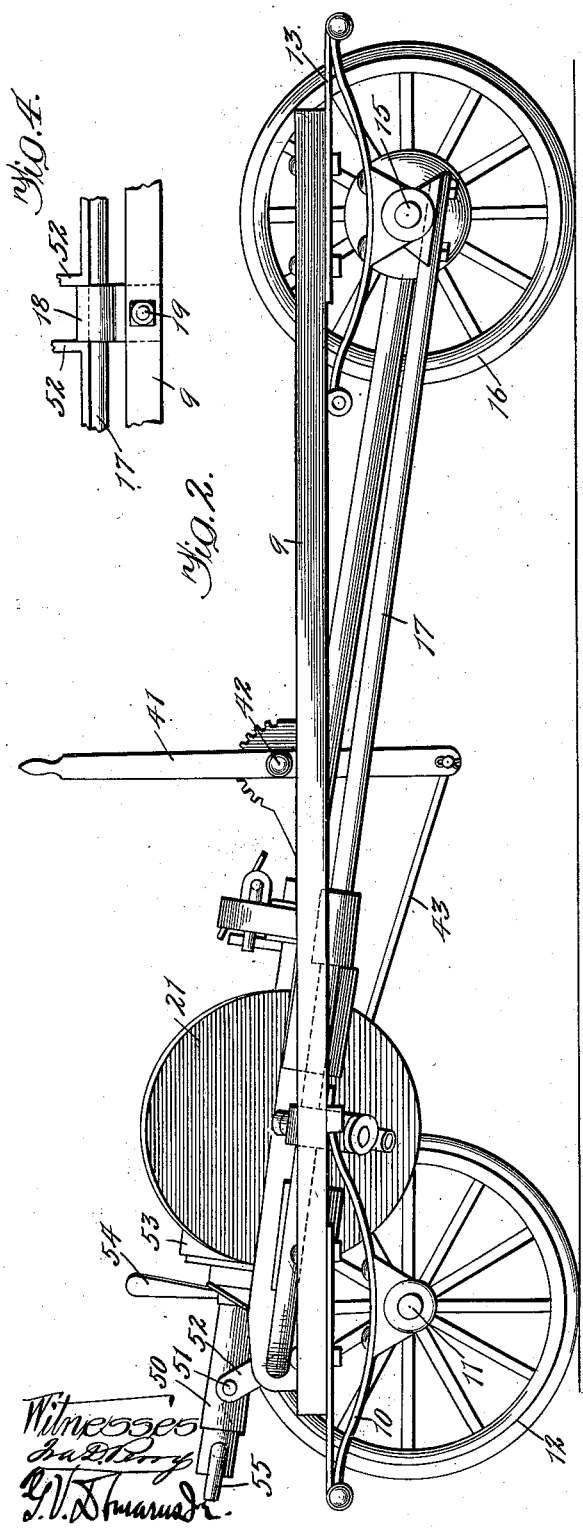
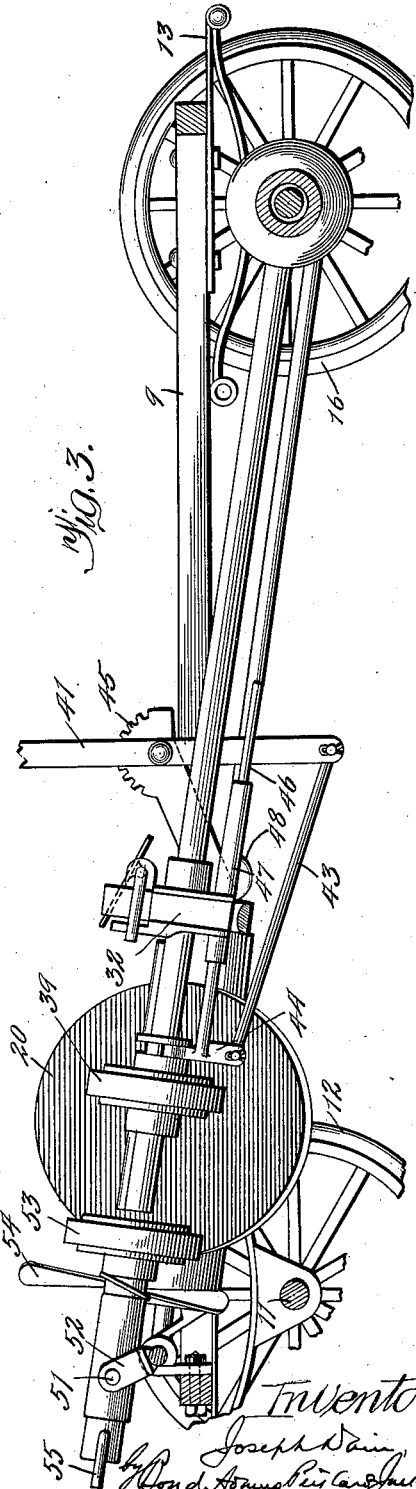

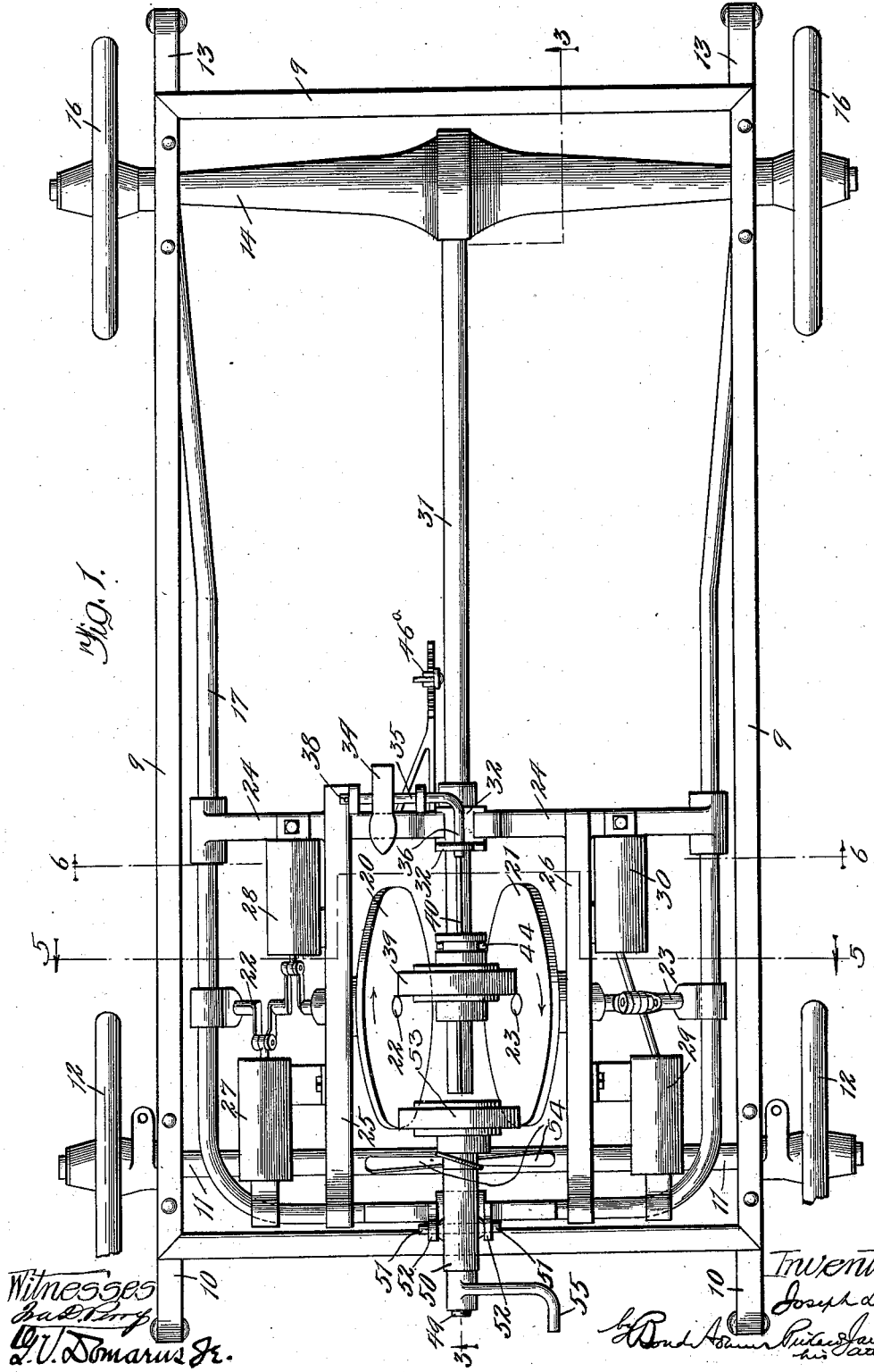

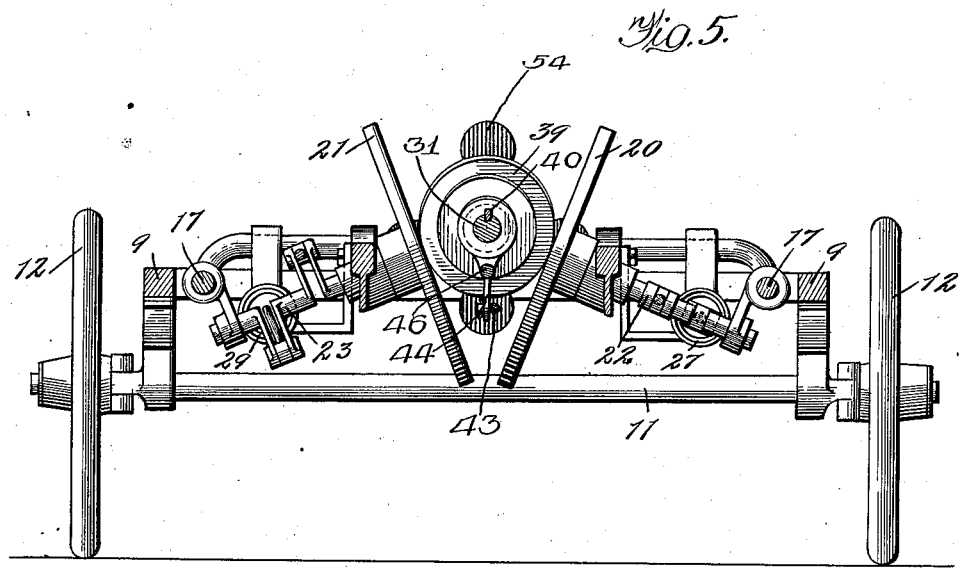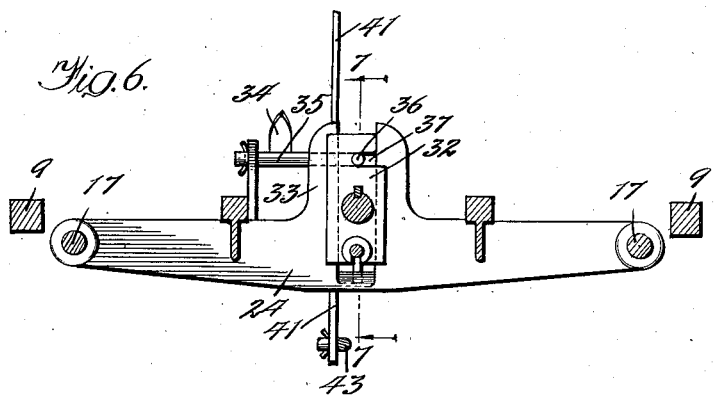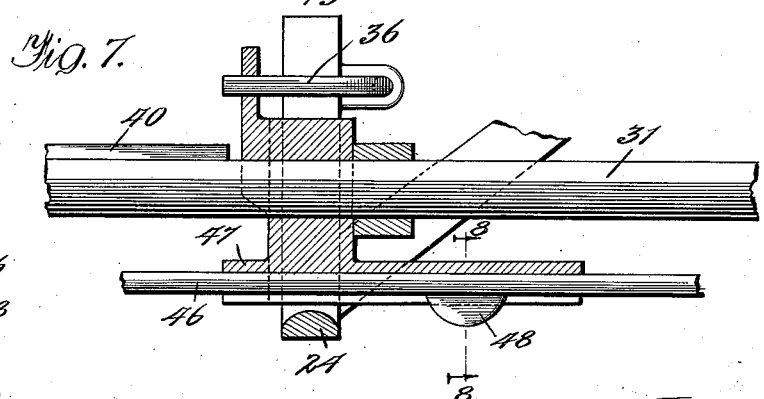

UNITED STATES PATENT OFFICE.

JOSEPH DAIN, OF OTTUMWA, IOWA.

GEARING.

1,028,441.  Specification of Letters Patent. Patented June 4, 1912.

Application filed November 2, 1907. Serial No. 400,371.

*To all whom it may concern:*

Be it known that I, JOSEPH DAIN, a citizen of the United States, residing at Ottumwa, in the county of Wapello and State of Iowa, have invented certain new and useful Improvements in Gearing, of which the following is a specification, reference being had to the accompanying drawings.

My invention relates to gearing, and has for its objects to provide a new and improved gearing for transmitting power and a new and improved motor vehicle having such gearing applied thereto. I accomplish these objects as hereinafter described and as illustrated in the drawings.

What I regard as new is set forth in the claims.

In the accompanying drawings in which I have illustrated my invention as applied to a motor vehicle, Figure 1 is a plan view of the chassis of a motor vehicle showing the application of my invention thereto; Fig. 2 is a side elevation thereof; Fig. 3 is a longitudinal section on line 3—3 of Fig. 1; Fig. 4 is a detail, illustrating the pivotal support for the front portion of the auxiliary frame; Fig. 5 is a vertical cross-section on line 5—5 of Fig. 1; Fig. 6 is a cross-section on line 6—6 of Fig. 1; Fig. 7 is a section on line 7—7 of Fig. 6; and Fig. 8 is a section on line 8—8 of Fig. 7.

The frame of the machine illustrated in the drawings is composed of what may be termed a main frame and an auxiliary frame,—the term "main frame" being that applied to a frame which directly supports the body of the vehicle and the forward portion of the auxiliary frame, while the term "auxiliary frame" is applied to a frame the rear portion of which is connected with the rear axle or differential casing, its front portion being pivotally supported centrally by the main frame so that it may rock about its longitudinal axis independently of the main frame, and also about a transverse axis, so that it is practically connected at its front end with the main frame by a universal joint. The auxiliary frame has no direct connection with the front wheels, which are connected with and directly support the forward portion of the main frame. The latter is supported on springs in a substantially horizontal position, while the auxiliary frame is inclined downward toward the rear, its front end being preferably slightly higher than the front end of the main frame. The motors and transmission are supported by the auxiliary frame near the front end thereof, and said frame also supports a drive-shaft which extends longitudinally at the center thereof and connects with the differential. By thus placing the drive-shaft in the longitudinal axis of the auxiliary frame, supporting said frame so that it may rock about such axis, connecting said frame with the rear axle or differential housing, and mounting the transmission on said frame, I make it practicable to use a drive-shaft which is continuous throughout, as there is no necessity of providing universal joints. The auxiliary shaft is free to rock as may be necessary under working conditions, and as the differential, transmission and drive-shaft are all carried by it and are fixedly held in their respective positions they are not affected in any way by the position of the auxiliary frame.

My improved gearing which, in the embodiment illustrated forms the transmission of a motor vehicle, is of the friction-drive type, and, generally speaking, consists of two suitably-driven opposed friction disks set at an angle to each other, the drive-shaft extending between them and having a friction disk which is adapted to engage the opposing faces of the two drive disks, the inner faces of which rotate in opposite directions. In the best form of my invention the disks are set so that they are closer together at the bottom, their axes being disposed transversely of the frame of the machine, and being inclined so that their outer ends are lowermost. The axis or shaft of each drive-disk is provided with cranks connected with a suitable motor, such as a gasolene engine, and the drive-shaft is provided with a friction disk which is arranged to be moved longitudinally of such shaft so that it may be adjusted toward or from the centers of the drive disks moving on a keyway or otherwise arranged so that its rotation is transmitted to the drive-shaft. Said driven disk is arranged so that it may be moved beyond the centers of the drive disks in order to provide for reversing the direction of rotation of the drive-shaft without reversing the drive disks. Owing to the inclination of the drive disks the weight of the driven disk and the inner end of the drive-shaft serve to provide sufficient frictional engagement between the driven disk and the drive disks for ordinary purposes, but provision is made for pressing down the driven disk more closely into engagement with the drive disks or for lifting said driven disk out of engagement with the drive disks, as may be desired. The drive-shaft lies radially with reference to the centers of the drive disks. Similar provision is made for driving the usual ventilating fan and for rotating the drive disks to start the motors.

Referring now to the drawings for a more particular description of the embodiment of my invention therein illustrated,—9 indicates the main frame, which is of the usual rectangular shape and at its front end rests upon springs 10 carried by the front axle 11.

12 indicates the front wheels, which are connected with the front axle by steering knuckles in the usual way. At its rear end the main frame 9 rests upon springs 13 which are supported by the differential housing 14 which incloses the rear axle 15.

16 indicates the rear wheels.

17 indicates the auxiliary frame, which, as shown in Figs. 1 and 2, is connected at its rear ends with the differential housing 14 near the outer ends thereof and at its front end is pivotally supported in a sleeve 18 arranged transversely and itself pivotally connected to the center of the main frame 9 by a bolt 19, or other suitable pivot, as shown in Fig. 4. The arrangement is such that the auxiliary frame may rotate in the sleeve 18 and may also rock or swing about the pivot 19, which is in line with the longitudinal axis of the machine.

20—21 indicate the drive disks which, as shown in Figs. 1 and 5, are arranged in opposition and inclined relatively to each other, their lower margins being closest together. Said disks are mounted respectively on crank shafts 22—23 which extend transversely of the machine and are supported in suitable bearings provided on the auxiliary frame. For this purpose, as shown in Fig. 1, the auxiliary frame is preferably provided with a crossbar 24 and longitudinally-extending bars 25—26 which together form a supporting frame for the various parts of the transmission and the motors.

27—28 indicate the cylinders of a motor which is connected with the crank shaft 22 and 29—30 the cylinders of a motor which is connected with the crank shaft 23. Said motors may be of any suitable type, their purpose being to drive the crank shafts 22—23 and thereby effect the rotation of the drive disks 20—21. It will be understood that said disks rotate so that their inner faces move in opposite directions.

31 indicates the drive shaft, the rear end of which is connected with the differential in the usual way, its front end being mounted in a bearing block 32 which is supported by the crossbar 24 in such manner that it may be moved vertically therein. To this end, the block 32 is preferably grooved at its opposite edges so that ways are formed which receive upright arms 33 rising from the cross-bar 24, as shown in Fig. 6. Said block 32 may be raised and lowered by a foot-lever or pedal 34 mounted on a transverse shaft 35, the inner end of which is bent at an angle, as shown at 36 in Fig. 1, and extends into a notch or recess 37 provided at the upper end of the block 32. By this construction, by rocking the pedal 34 the block 32 may be raised or lowered. The end 36 of the shaft 35 may be disengaged from the block 32 by moving it endwise until it passes out of the recess 37. A pin 38 in the shaft 35 normally holds said shaft in engagement with said block. The arrangement shown is a simple form of mechanism for moving the block 32 vertically, but any other suitable means may be employed. The forward end of the drive shaft 31 extends between the drive disks 20—21, and when the block 32 is in its normal position the position of said shaft is substantially radial with reference to said disks. It will be noted also that said shaft extends forward of the centers of said disks.

39 indicates a friction disk, which will be termed the "driven disk", since it is driven by the drive disks 20—21. Said driven disk is mounted upon the shaft 31 so as to move longitudinally thereof and is connected therewith by a feather 40 so that rotation of said disk is communicated to said shaft. Said disk 39 is of such diameter that when the shaft 31 is in its normal position said disk is in contact with the inner faces of the drive disks 20—21. The driven disk 39 may be moved toward or from the centers of the drive disks and may be moved either forward or backward of the axes thereof. The normal position of the driven disk 39 is back of the crank shafts 22—23, in which position it is rotated so as to drive the machine ahead. By moving the disk 39 forward of the crank shafts, however, the direction of rotation of the drive-shaft will be reversed. Furthermore, when the drive-shaft is lifted by the operation of the foot pedal 34 the driven disk 39 may be moved out of engagement with the drive disks to facilitate the shifting of said driven disk, or for any other purpose; or, if desired, by operating the foot pedal 34 the forward end of the drive shaft 31 may be depressed to press the driven disk 39 more closely in contact with the drive disks, thereby increasing the frictional engagement between them. Ordinarily, however, the weight of the parts will be sufficient to secure adequate frictional engagement of the disks, and this is an important advantage of arranging the inclined drive disks so that they are closest together at the bottom, since gravity is employed to hold the driven disk in engagement with the drive disks instead of using springs for that purpose. My invention in its broader aspect, however, is not restricted to arranging the drive disks so that they are closest together at the bottom.

The driven disk may be moved longitudinally by means of a hand-lever 41 fulcrumed at 42 upon the auxiliary frame and connected by a rod 43 and fork 44 with the driven disk 39. The lever 41 is provided with the usual notched segment 45 and dog 46ᵃ for locking the disk 39 in position.

46 indicates a rod connected with the fork 44 and sliding in a suitable bearing or sleeve 47 secured to the block 32, as best shown in Figs. 3 and 7. Said rod 46 is provided on its under side with a cam 48 which rides upon the lower portion of the crossbar 24 when the driven disk 39 is moved into line with the centers of the drive disks. (See Figs. 3 and 7). The cam 48 is so shaped that when it rests upon the crossbar 24 it will lift the drive-shaft 31 sufficiently to move the driven disk 39 out of engagement with the drive disks, so that when said driven disk is moved to the center of the drive disks it is automatically lifted out of engagement therewith; and this is true whether the driven disk be moved forward or backward.

It will be observed that the drive-shaft 31 is a continuous shaft without universal or other joints, and that it is disposed at the longitudinal center of the auxiliary frame; also that the transmission and motors are all carried by the auxiliary frame, which is rigidly connected at the rear with the differential housing, and pivotally connected at the front with the main frame. Thus all the parts of the driving mechanism are supported by the same frame and are not subjected to wrenching strains encountered by the car while in use. Moreover, oscillation of the auxiliary frame due to inequalities in the road, etc., does not affect the driving mechanism, since the drive-shaft and drive disks all move with the auxiliary frame and maintain the same position with relation to each other regardless of the movement of the frame. The forward part of the auxiliary frame, however, receives the full benefit of the springs which directly support the forward portion of the main frame. The inclination of the drive disks relatively to each other is advantageous because it provides for readily varying the frictional engagement between the drive disks and the driven disk and also permits of the immediate disengagement of the driven disk and the drive disks regardless of the position of the driven disk. By this arrangement also I am able to secure a positive contact between the driven disk and the drive disks and utilize the weight of the driven disk and drive-shaft to insure proper engagement between said parts. This is particularly useful in automatically compensating for wear on the disks.

For starting the motors and also for operating the usual ventilating fan I provide a fan-shaft 49, which is mounted in a sleeve 50 arranged at the front of the auxiliary frame substantially in line with the drive-shaft 31. Said sleeve is mounted in trunnions 51 which extend transversely, as shown in Fig. 1, and fit in suitable arms 52 which are secured to and rise from the forward portion of the auxiliary frame at opposite sides of the bearing 18, as shown in Fig. 4. Thus the shaft 49 may be rocked about the trunnions 51. 53 indicates a friction disk mounted on the inner end of the shaft 49 and arranged to be driven by the disks 20—21 in the same manner as the driven disk 39. Said disk 53, however, does not move longitudinally as there is no necessity for such movement.

54 indicates a ventilating fan mounted on the shaft 49 adjacent to the disk 53, which serves not only to drive the fan and equalize the pressure on the drive disks, but also as a means of starting the motors.

55 indicates a crank mounted on the outer end of the shaft 49 for rotating said shaft by hand. Said crank may be provided with the usual ratchet mechanism so that it may hang pendent when not in use, or it may be made detachable, as required.

The operation of the machine will doubtless be understood from the foregoing description, but it may be explained that in starting the motors the driven disk 39 would first be moved into line with the axes of the drive disks 20—21 when, as has been stated, it is held out of engagement therewith by the cam 48. The drive disks would then be rotated by rotating the crank 55 which would start the motors. The car is then started by moving the driven disk 39 backward on the drive-shaft 31, power being transmitted to the drive-shaft as soon as the driven disk comes into engagement with the drive disks. Normally its engagement would be first effected near the centers of the drive disks, and consequently the driven disk would at first be rotated slowly, its speed increasing with its movement toward the outer margins of the drive disks. If desired, the driven disk could be moved at once to its outermost position, or to any intermediate position, in which case the drive-shaft would be lifted by the pedal 34 so as to hold the driven disk out of engagement with the drive disks until the desired point was reached. In this case the driven disk would be slowly lowered into engagement with the drive disks so that the drive-shaft would not be started or accelerated too abruptly.

So far as I am aware, my improved motor vehicle and the gearing embodied therein are broadly new. The claims hereinafter made are, therefore, to be construed broadly and are not to be restricted to the specific construction described, except in so far as such construction is particularly claimed. Furthermore, while my improved transmission is intended primarily for motor car use, it may be applied to any other use to which it is adapted, and the claims are to be construed accordingly.

Generically considered the terms "drive" and "driven" as used in the specification and claims may be considered relative, since, obviously, if power were initially applied to the shaft 31 the disks 20—21 would be driven disks and the disk 39 a drive disk.

That which I claim as my invention, and desire to secure by Letters Patent, is,—

1. A transmission-device, comprising disconnected disks arranged at an angle to each other, a disk adapted to coöperatively engage the inner faces of said disks, and power-transmitting devices connected with said disks.

2. A transmission device for motor vehicles, comprising disconnected drive disks arranged at an angle to each other, a driven disk arranged to be driven by said drive disks, and independent motors connected with said drive disks respectively for driving the same.

3. A transmission device for motor vehicles, comprising disconnected drive disks arranged at an angle to each other, a driven disk arranged to be driven by said drive disks, and independent motors for driving said drive disks respectively, said driven disk being movable toward and away from said drive disks.

4. A transmission device for motor vehicles, comprising disconnected drive disks arranged at an angle to each other, a driven disk arranged to be driven by said drive disks, and independent motors for driving said drive disks respectively, said driven disk being movable toward and away from said drive disks and toward and from the centers thereof.

5. A transmission device for motor vehicles, comprising disconnected drive disks arranged at an angle to each other, a shaft extending between said disks, a driven disk mounted on said shaft and movable longitudinally thereof between said drive disks, and independent motors connected with said drive disks respectively for driving the same.

6. A transmission-device, comprising disconnected disks arranged at an angle to each other, a shaft extending between said disks, a disk mounted on said shaft and adapted to engage the inner faces of said disks and being movable toward and from the centers thereof, and power-transmitting means connected with said first-mentioned disks.

7. A transmission-device, comprising opposed disks arranged at an angle to each other, a shaft extending between said opposed disks, a disk mounted on said shaft and adapted to engage the inner faces of said opposed disks and being movable toward and from the centers thereof, and power-transmitting means connected with said opposed disks, said shaft being movable to carry the disk thereon out of engagement with said opposed disks.

8. A transmission device, comprising a pair of friction disks inclined relatively to each other, an intermediate disk adapted to simultaneously engage the inner surfaces of said disks and movable toward and away from such surfaces, and means for operatively connecting or disconnecting said intermediate disk and said inclined disks.

9. A transmission device for motor vehicles, comprising opposed drive disks, the inner faces of which rotate in opposite directions, a drive-shaft extending between said disks, and a driven friction disk mounted upon said shaft and coöperating with said opposed disks for rotating said shaft, said shaft being movable to carry said driven disk out of engagement with said drive disks.

10. A transmission device for motor vehicles, comprising opposed drive disks, the inner faces of which rotate in opposite directions, a drive-shaft extending between said disks, and a driven friction disk mounted upon said shaft and coöperating with said opposed disks for rotating said shaft, said driven disk being movable longitudinally of said shaft toward or from the axes of said drive disks, and said shaft being movable to carry said driven disk out of engagement with said drive disks.

11. A transmission device for motor vehicles, comprising opposed drive disks, the inner faces of which rotate in opposite directions, a drive-shaft extending between said disks, a driven friction disk mounted upon said shaft and coöperating with said opposed disks for rotating said shaft, said driven disk being movable longitudinally of said shaft toward or from the axes of said drive disks, a lever for shifting said driven disk upon said shaft, and means for automatically disengaging said driven disk from said drive disks when it reaches a certain position.

12. A transmission device for motor vehicles, comprising opposed drive disks, the inner faces of which rotate in opposite directions, a drive-shaft extending between said disks, a driven friction disk mounted upon said shaft and coöperating with said opposed disks for rotating said shaft, said driven disk being movable longitudinally of said shaft toward or from the axes of said drive disks, a lever for shifting said driven disk upon said shaft, and means for automatically disengaging said driven disk from said drive disks when said driven disk is in line with the axes of said drive disks.

13. A transmission-device, comprising opposed drive disks, the inner faces of which rotate in opposite directions, said drive disks being inclined to each other, a drive shaft extending between said disks, and a driven disk mounted on said shaft and coöperating with said opposed disks for rotating said shaft, said driven disk being movable toward and from said drive disks to engage or disengage the same.

14. A transmission-device, comprising opposed drive disks, the inner faces of which rotate in opposite directions, said drive disks being inclined to each other, a drive shaft extending between said disks, and a driven disk mounted on said shaft and coöperating with said opposed disks for rotating said shaft, said driven disk being movable toward and from said drive disks to engage or disengage the same and being movable longitudinally of said shaft toward or from the axes of said drive disks.

15. A transmission device for motor vehicles, comprising opposed drive disks, the inner faces of which rotate in opposite directions, said drive disks being inclined to each other, a drive-shaft extending between said disks, a driven friction disk mounted upon said shaft and coöperating with said opposed disks for rotating said shaft, said driven disk being movable longitudinally of said shaft toward or from the axes of said drive disks, a lever for shifting said driven disk upon said shaft, and means for automatically disengaging said driven disk from said drive disks when it reaches a certain position.

16. A transmission device for motor vehicles, comprising opposed drive disks, the inner faces of which rotate in opposite directions, said drive disks being inclined to each other, a drive-shaft extending between said disks, a driven friction disk mounted upon said shaft and coöperating with said opposed disks for rotating said shaft, said driven disk being movable longitudinally of said shaft toward or from the axes of said drive disks, a lever for shifting said driven disk upon said shaft, and means for automatically disengaging said driven disk from said drive disks when said driven disk is in line with the axes of said drive disks.

17. A transmission device for motor vehicles, comprising opposed drive disks, the inner faces of which rotate in opposite directions, said drive disks being inclined to each other, a drive-shaft extending between said disks, a driven friction disk mounted upon said shaft and coöperating with said opposed disks for rotating said shaft, said driven disk being movable longitudinally of said shaft toward or from the axes of said drive disks, and means for moving said driven disk away from said drive disks.

18. A transmission-device, comprising opposed drive disks, the inner faces of which rotate in opposite directions, said drive disks being inclined to each other, the lower portions of said drive disks being closest together, a drive shaft extending between said disks, and a driven disk mounted on said shaft and coöperating with said opposed disks for rotating said shaft, said driven disk being movable toward and away from said drive disks to engage or disengage the same.

19. A transmission device for motor vehicles, comprising opposed drive disks, the inner faces of which rotate in opposite directions, said drive disks being inclined to each other, the lower portions of said drive disks being closest together, a drive-shaft extending between said disks, a driven friction disk mounted on said shaft and coöperating with said opposed disks for rotating said shaft, and means for lifting said driven disk out of engagement with said drive disks.

20. A transmission device for motor vehicles, comprising opposed drive disks, the inner faces of which rotate in opposite directions, said drive disks being inclined to each other, the lower portions of said drive disks being closest together, a drive-shaft extending between said disks, a driven friction disk mounted on said shaft and coöperating with said opposed disk for rotating said shaft, and means for automatically lifting said driven disk out of engagement with said drive disks when said driven disk is moved into line with the axes of said drive disks.

21. In a power transmitting mechanism, a pair of transmission disks disposed in planes at an angle with each other, means for rotating said disks, a rotary driven member in contact with the meeting faces of said disks and receiving motion therefrom, and means for varying the pressure between the contacting surfaces of said driven member and said transmission disks.

22. A transmission device for motor vehicles, comprising opposed drive disks, the inner faces of which rotate in opposite directions, a drive-shaft extending between said disks, and a driven friction disk mounted upon said shaft and coöperating with said opposed disks for rotating said shaft, in combination with a crank shaft having a crank and a friction disk for starting said drive disks, said crank shaft being pivotally supported so that the friction disk carried thereby may be moved out of engagement with said drive disks.

23. A transmission device for motor vehicles, comprising disconnected drive disks, the inner faces of which rotate in opposite directions, said drive disks being inclined to each other, means for driving said disks, and means coöperating with said inclined disks for transmitting power therefrom.

24. A transmission device for motor vehicles, comprising disconnected drive disks arranged at an angle to each other, means for driving said disks, and a driven disk arranged to be driven by said drive disks.

25. A transmission device for motor vehicles, comprising opposed drive disks arranged at an angle to each other, a shaft extending between said disks, a driven disk mounted on said shaft and movable longitudinally thereof between said drive disks, and independent motors connected with said drive disks respectively for driving the same, said shaft being movable to carry the driven disk toward and from the drive disks.

26. A transmission device for motor vehicles, comprising disconnected drive disks, the inner faces of which rotate in opposite directions, said drive disks being inclined to each other, a shaft, a driven disk mounted on said shaft and movable longitudinally thereof between said drive disks and toward or from the axes thereof, and means for driving said drive disks.

27. A transmission device for motor vehicles, comprising opposed drive disks, the inner faces of which rotate in opposite directions, a drive-shaft extending between said disks, a driven friction disk mounted upon said shaft and coöperating with said opposed disks for rotating said shaft, in combination with a crank shaft having a crank and a friction disk for starting said drive disks, and a ventilating fan mounted on said crank shaft.

28. A transmission device for motor vehicles, comprising opposed drive disks, the inner faces of which rotate in opposite directions, a drive-shaft extending between said disks, a driven friction disk mounted upon said shaft and coöperating with said opposed disks for rotating said shaft, in combination with a crank shaft having a crank and a friction disk for starting said drive disks, said crank shaft being pivotally supported so that the friction disk carried thereby may be moved out of engagement with said drive disks, and a ventilating fan mounted on said crank shaft.

29. A transmission device, comprising opposed disks arranged at an angle to each other, a disk adapted to coöperatively engage the inner faces of said disks and movable toward and away therefrom, and power-transmitting devices connected with said disks.

30. A transmission device, comprising opposed drive disks inclined relatively to each other, means for driving said disks, and means movable toward and away from said inclined disks for transmitting power therefrom.

31. A transmission device, comprising opposed drive disks inclined relatively to each other, means for driving said disks, and a driven disk movable toward and away from said inclined disks for transmitting power therefrom.

32. A transmission-device, comprising a pair of oppositely-inclined disks set a distance apart, an intermediate disk adapted to engage the inner faces of said inclined disks, and power transmitting devices connected with said disks.

33. A transmission-device, comprising a pair of oppositely-inclined non-contacting disks, an intermediate disk between said inclined disks and operatively engaging the inner faces thereof, and power-transmitting devices connected with said disks.

34. A transmission-device, comprising a pair of oppositely-inclined disks set a distance apart, an intermediate disk adapted to engage the inner faces of said inclined disks, said intermediate disk being movable toward and from said inclined disks to engage or disengage the same, and power transmitting devices connected with said disks.

35. A transmission-device, comprising a pair of oppositely-inclined non-contacting disks, an intermediate disk between said inclined disks and operatively engaging the inner faces thereof, said intermediate disk being movable toward and from said inclined disks to engage or disengage the same, and power transmitting devices connected with said disks.

36. In a power transmitting mechanism, a pair of rotary transmission disks spaced apart and disposed in planes converging toward one side thereof, and a rotary disk in wedging contact with the first-named disks.

37. In a power transmitting mechanism, a pair of rotary transmission disks spaced apart and disposed in planes converging toward one side thereof, means for rotating said disks, and a rotary disk in wedging contact with the first-named disks.

38. In a power transmitting mechanism, opposite transmission disks disposed in downwardly-converging planes, intermediate disks in frictional contact with the meeting faces of the first-named disks, and means for moving one of said intermediate disks vertically into and out of such contact.

JOSEPH DAIN.

Witnesses:
 JOHN L. JACKSON,
 MINNIE A. HUNTER.

Copies of this patent may be obtained for five cents each, by addressing the "Commissioner of Patents, Washington, D. C."